(12) United States Patent
Kimmel et al.

(10) Patent No.: US 11,209,212 B2
(45) Date of Patent: Dec. 28, 2021

(54) HIGH PRESSURE CAPABLE LIQUID TO REFRIGERANT HEAT EXCHANGER

(71) Applicant: Modine Manufacturing Company, Racine, WI (US)

(72) Inventors: Adam Kimmel, Franksville, WI (US); David Hartke, Gurnee, IL (US); Gregory Mross, Mount Pleasant, WI (US); Daniela Welchner, Zell unter Aichelberg (DE); Michael Steffen, Birkenfeld (DE)

( * ) Notice: Subject to any disclaimer, the term of this patent is extended or adjusted under 35 U.S.C. 154(b) by 0 days.

(21) Appl. No.: 17/040,930

(22) PCT Filed: Mar. 21, 2019

(86) PCT No.: PCT/US2019/023310
§ 371 (c)(1),
(2) Date: Sep. 23, 2020

(87) PCT Pub. No.: WO2019/183312
PCT Pub. Date: Sep. 26, 2019

(65) Prior Publication Data
US 2021/0033345 A1    Feb. 4, 2021

Related U.S. Application Data

(60) Provisional application No. 62/647,053, filed on Mar. 23, 2018.

(51) Int. Cl.
*F28D 1/047* (2006.01)
*F28F 1/04* (2006.01)
(Continued)

(52) U.S. Cl.
CPC ......... *F28D 1/0478* (2013.01); *F28D 7/1615* (2013.01); *F28F 1/04* (2013.01);
(Continued)

(58) Field of Classification Search
CPC .... F28D 1/06; F28D 1/0478; F28D 2001/026; F28D 7/1615; F28D 7/005; F28D 7/087; F28F 9/001; F28F 9/005; F28F 9/0243
(Continued)

(56) References Cited

U.S. PATENT DOCUMENTS 2,646,258 A    7/1953  Freer
2,919,903 A *  1/1960  Vautrain ............... F28F 9/0239
                                                        165/110
(Continued)

FOREIGN PATENT DOCUMENTS

EP     2402694 A1      1/2012
KR     101520339 B1    5/2015
WO     2017030381 A1   2/2017

OTHER PUBLICATIONS

International Search Report and Written Opinion for Application No. PCT/US2019/023310 dated May 30, 2019 (8 pages).
(Continued)

*Primary Examiner* — Devon Russell
(74) *Attorney, Agent, or Firm* — Michael Best & Friedrich LLP

(57) ABSTRACT

A liquid to refrigerant heat exchanger includes a coolant volume that is at least partially defined by a plastic housing and by a metal closure plate. The plastic housing is sealingly joined to the closure plate along an outer periphery of the closure plate. The metal closure plate can be part of a brazed assembly that defines a continuous refrigerant flow path through the heat exchanger between a refrigerant inlet port and a refrigerant outlet port.

15 Claims, 3 Drawing Sheets

(51) Int. Cl.
  *F28F 9/00* (2006.01)
  *F28F 9/02* (2006.01)
  *F28D 7/16* (2006.01)
  *F28D 1/02* (2006.01)
  *F28F 1/12* (2006.01)
(52) U.S. Cl.
  CPC .............. *F28F 9/001* (2013.01); *F28F 9/005* (2013.01); *F28F 9/0243* (2013.01); *F28D 2001/026* (2013.01); *F28F 1/126* (2013.01); *F28F 2009/029* (2013.01); *F28F 2230/00* (2013.01); *F28F 2275/04* (2013.01)
(58) Field of Classification Search
  USPC .................................................. 165/142, 158
  See application file for complete search history.

(56) References Cited

U.S. PATENT DOCUMENTS

| | | | |
|---|---|---|---|
| 4,700,774 A | 10/1987 | Schwarz | |
| 5,875,837 A | 3/1999 | Hughes | |
| 5,944,089 A | 8/1999 | Roland | |
| 6,892,803 B2* | 5/2005 | Memory | F28F 1/022 165/165 |
| 7,337,769 B2 | 3/2008 | Yi | |
| 8,011,422 B2* | 9/2011 | Yamazaki | F28F 3/044 165/82 |
| 9,163,716 B2* | 10/2015 | Chudy | F16H 57/0417 |
| 9,506,701 B2 | 11/2016 | Khelifa et al. | |
| 2004/0194934 A1 | 10/2004 | Hofbauer | |
| 2006/0288727 A1* | 12/2006 | Aikawa | F25D 16/00 62/434 |
| 2008/0202724 A1 | 8/2008 | Lorenz et al. | |
| 2008/0289804 A1* | 11/2008 | Baumann | F28F 9/22 165/157 |
| 2009/0277606 A1* | 11/2009 | Reiss, III | F28D 7/1692 165/69 |
| 2010/0206534 A1 | 8/2010 | Amaya et al. | |
| 2012/0061053 A1* | 3/2012 | Geskes | F28F 21/067 165/67 |
| 2013/0213621 A1 | 8/2013 | Pierre et al. | |
| 2014/0000841 A1 | 1/2014 | Baker et al. | |
| 2014/0027099 A1 | 1/2014 | Sispera et al. | |
| 2014/0130764 A1* | 5/2014 | Saumweber | F02M 35/10 123/184.21 |
| 2015/0107807 A1* | 4/2015 | Hund | F28D 7/1692 165/158 |
| 2015/0176922 A1* | 6/2015 | Day | F28F 9/0226 165/158 |
| 2015/0292804 A1* | 10/2015 | Hermida Dominguez | F28F 21/084 165/167 |
| 2015/0338169 A1* | 11/2015 | Okami | F28F 13/08 165/157 |
| 2015/0345877 A1* | 12/2015 | Mori | F28F 9/22 165/138 |
| 2017/0146303 A1 | 5/2017 | Mayo et al. | |
| 2019/0120562 A1 | 4/2019 | Fuller | |
| 2019/0285365 A1 | 9/2019 | Streeter | |

OTHER PUBLICATIONS

Office Action issued from the US Patent Office for related U.S. Appl. No. 16/582,664 dated Sep. 3, 2021 (11 Pages).

* cited by examiner

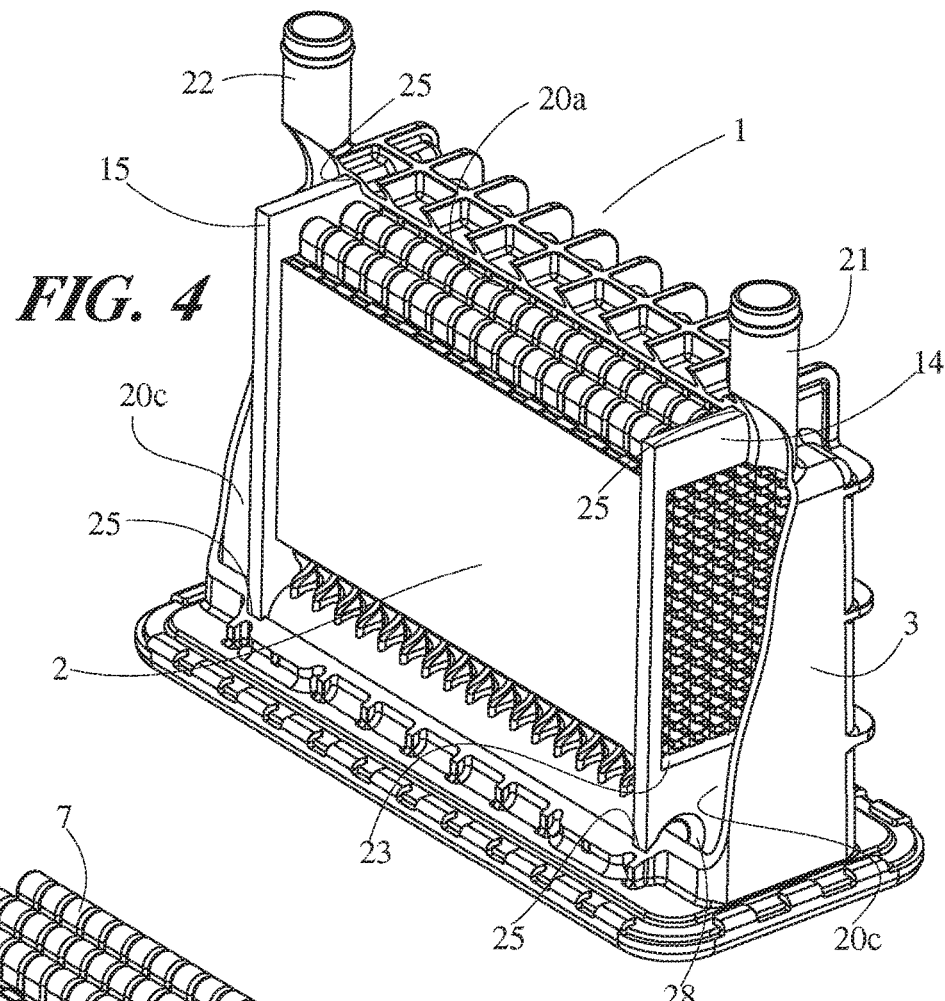
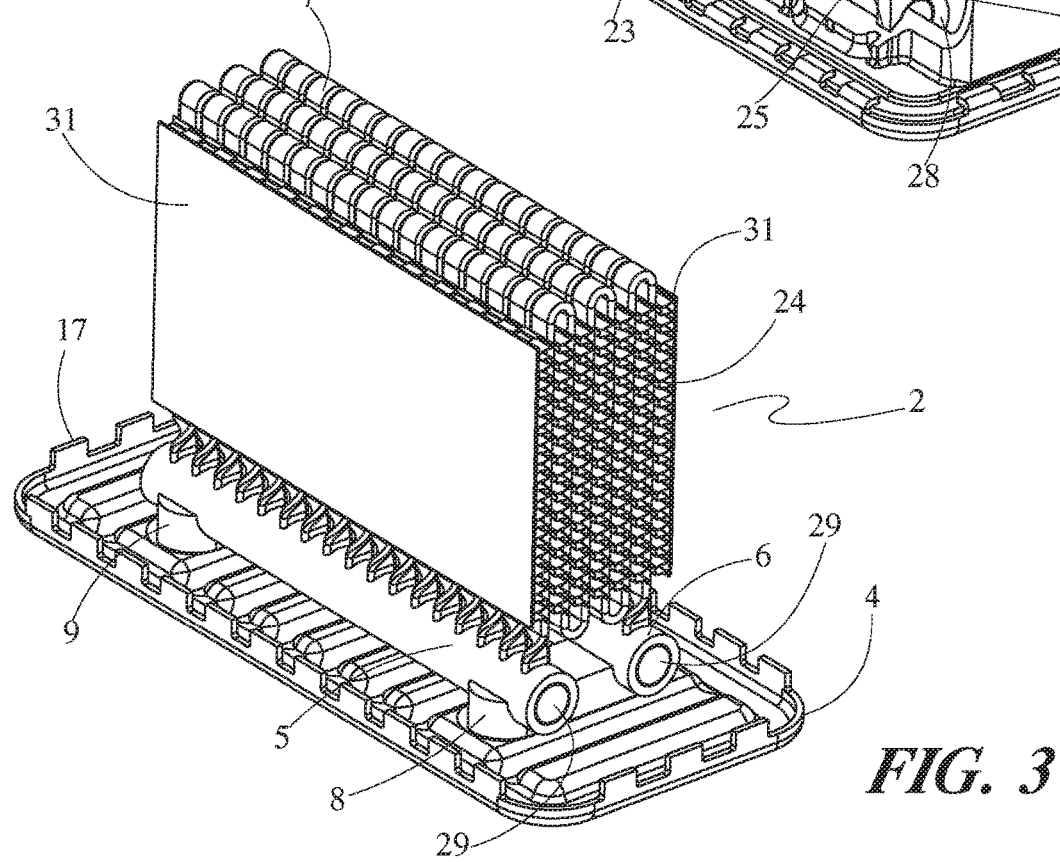

HIGH PRESSURE CAPABLE LIQUID TO REFRIGERANT HEAT EXCHANGER

CROSS-REFERENCE TO RELATED APPLICATIONS

This application claims priority to U.S. Provisional Patent Application No. 62/647,053 filed on Mar. 23, 2018, the entire contents of which are hereby incorporated by reference herein.

BACKGROUND

Chiller systems are commonly used in a variety of applications to produce a cooled supply of a liquid coolant at a temperature that is lower than can be achieved by direct ambient air cooling. In a conventional chiller system, a vapor compression refrigerant system is typically employed to produce a flow of at least partially liquid refrigerant at a low temperature and to supply that refrigerant in that state to a liquid to refrigerant heat exchanger in order to transfer heat from a flow of the liquid coolant to the refrigerant, thereby evaporating the refrigerant and chilling the liquid coolant to a suitably low temperature. The evaporated refrigerant is subsequently compressed to an elevated pressure, at which condition the absorbed heat can be rejected to, for example, ambient air in order to re-condense the refrigerant.

Such chiller systems are oftentimes applied for producing large flows of chilled coolant, such as for building cooling and the like, and are consequently large in scale. As a result, the liquid to refrigerant heat exchangers used to transfer the heat between the coolant and the evaporating refrigerant are likewise of a relatively large scale. More recently, the advent of electrified vehicles have created a need for substantially smaller, lighter, and more compact chiller systems to produce chilled coolant for the cooling of batteries, inverters, motors, and other power electronics associated with the use of electric vehicles. The liquid to refrigerant heat exchangers that are typically used in chiller systems have proven to be particularly unsuitable for such applications, being neither compact nor light in weight.

The problem is further exacerbated in vehicle chiller systems that use a high-pressure refrigerant such as carbon dioxide. Such systems are seen as particularly advantageous in that carbon dioxide is neither flammable nor toxic, is naturally occurring, inexpensive, widely available, and has a net global warming impact of zero. Furthermore, carbon dioxide performs particularly well as a heat pumping fluid, wherein the refrigerant cycle is reversed to that the liquid to refrigerant heat exchanger is used to transfer heat from the compressed refrigerant to the liquid coolant in order to heat the liquid coolant. Such operation is particularly advantageous in electric vehicle applications, wherein the waste heat produced by the vehicle drivetrain is insufficient to provide proper cabin heating in cold weather operation.

The use of natural refrigerants such as carbon dioxide can be difficult, however, due to their operation at relatively high pressures. Such high system pressures requires that the equipment of the chiller system—including the heat exchangers—be capable of withstanding the structural loads imposed by the operating pressure while still affording the advantages of compact and light weight construction. An example of a liquid to refrigerant heat exchanger for use with carbon dioxide refrigerant that is capable of withstanding the elevated pressures of carbon dioxide refrigerant system operation can be found in U.S. Pat. No. 6,892,803 to Memory et al. The housingless liquid to refrigerant heat exchanger of Memory et al. uses high pressure capable refrigerant tubes interleaved with coolant tubes.

SUMMARY

According to embodiments of the invention, a liquid to refrigerant heat exchanger provides a refrigerant flow path through the heat exchanger that is capable of withstanding elevated refrigerant pressures. A coolant flow path through the heat exchanger is at least partially bounded by a plastic housing.

Within this written description, the liquid that is exchanging heat with the refrigerant within the heat exchanger will generically be referred to as a "coolant". It should be understood that, while the exemplary embodiment of the invention described herein is particularly well-suited for use with traditional automotive coolants such as water, ethylene glycol, propylene glycol, etc., or mixtures of the same, the invention is not limited to the use of such liquids. Other liquids capable of being heated and/or cooled by a flow of refrigerant can be equally suitable for use in the exemplary embodiment or in other embodiments, and the invention is not intended to be limited to use with any particular types of liquids.

A liquid to refrigerant heat exchanger according to the invention can be especially well-suited for use in a chiller system using a natural refrigerant such as carbon dioxide. The heat exchanger can be used in such a system to transfer heat from a liquid coolant to a flow of refrigerant, or from a flow of refrigerant to a liquid coolant. In some such systems the system can be reversible, so that under some operating conditions the direction of heat transfer is from the refrigerant to the coolant and under other operating conditions the direction of heat transfer is from the coolant to the refrigerant.

In at least one embodiment, the liquid to refrigerant heat exchanger includes a coolant volume that is at least partially defined by a plastic housing and by a metal closure plate. The plastic housing is sealingly joined to the closure plate along an outer periphery of the closure plate. In at least some embodiments, the seal is created by a peripheral crimp joint.

In some embodiments, the liquid to refrigerant heat exchanger further includes a cylindrical inlet manifold and a cylindrical outlet manifold arranged within the coolant volume, along with refrigerant conduits that are arranged within the coolant volume and that extend from the cylindrical inlet manifold and the cylindrical outlet manifold to convey a flow of refrigerant from the inlet manifold to the outlet manifold. An inlet fitting block and an outlet fitting block are each joined to, and extend through, the metal closure plate. A portion of each of the fitting blocks is located within the coolant volume, and another portion of each of the fitting blocks is arranged outside of the coolant volume. In at least some such embodiments, the inlet fitting block and the outlet fitting block each extend through flanged apertures in the closure plate.

In at least some such embodiments, the inlet manifold is joined to the portion of the inlet fitting block that is located within the coolant volume, and the outlet manifold is joined to the portion of the outlet fitting block that is located within the coolant volume. In at least some embodiments the outlet manifold is also joined to that portion of the inlet fitting block, and the inlet manifold is also joined to the that portion of the outlet fitting block.

A refrigerant inlet port is arranged on that portion of the inlet fitting block that is located outside of the coolant volume, and a refrigerant outlet port is arranged on that portion of the outlet fitting block that is located outside of the coolant volume. The refrigerant inlet port is in fluid communication with an internal volume of the inlet manifold by way of a flow path extending through the inlet fitting block, and the refrigerant outlet port is in fluid communication with an internal volume of the outlet manifold by way of a flow path extending through the outlet fitting block.

In at least some embodiments, the closure plate, the inlet fitting block, the outlet fitting block, the inlet manifold, the outlet manifold, and the refrigerant conduits are all joined together by braze joints in order to define a leak-free refrigerant flow path between the refrigerant inlet port and the refrigerant outlet port.

In at least some embodiments, each of the refrigerant conduits includes several sequentially arranged passes through the coolant volume. In some such embodiments, coolant fins are arranged between and joined to adjacent and/or successive passes of the refrigerant conduits. In some embodiments, the coolant fins are brazed to the refrigerant conduits in the same brazing operation that joins the refrigerant conduits to the inlet and outlet manifolds.

In some embodiments, the coolant volume of the liquid to refrigerant heat exchanger is divided into a coolant inlet portion located at one of the heat exchanger, a coolant outlet portion arranged at another end of the heat exchanger opposite that one end, and a heat exchange portion arranged between the coolant inlet portion and the coolant outlet portion. In at least some embodiments the refrigerant conduits are arranged within the heat exchange portion of the coolant volume.

In some such embodiments, the heat exchanger includes a first coolant baffle arranged between the coolant inlet portion and the heat exchange portion, and a second coolant baffle arranged between the coolant outlet portion and the heat exchange portion. In some such embodiments, the first and the second coolant baffles each have an aperture that corresponds to an outer periphery of coolant fins that are joined to the refrigerant conduits. In some embodiments the first and the second coolant baffles are received within recessed grooves provided in the plastic housing.

BRIEF DESCRIPTION OF THE DRAWINGS

FIG. 3 is a perspective view of portions of the liquid to refrigerant heat exchanger of FIG. 1 prior to final assembly.

FIG. 4 is a partially cut-away perspective view of the liquid to refrigerant heat exchanger of FIG. 1.

DETAILED DESCRIPTION

Figure 1:
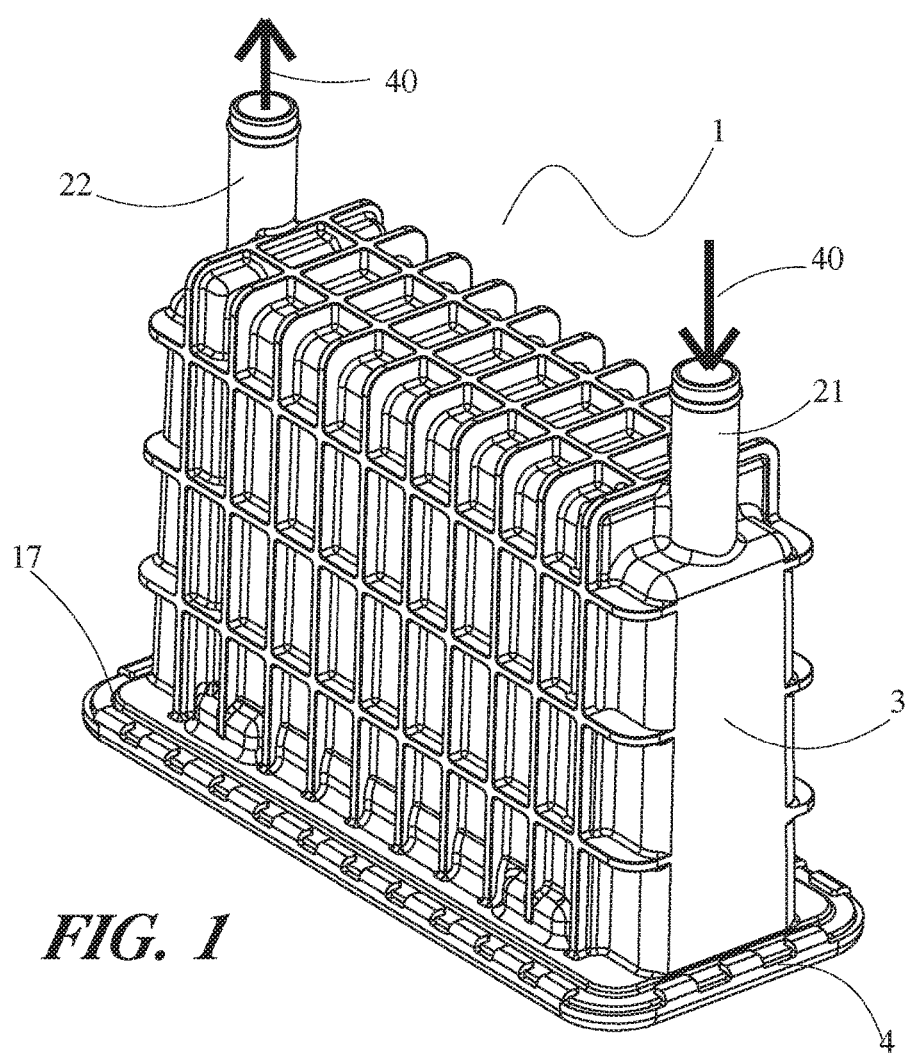
FIG. 1 is a perspective view of a liquid to refrigerant heat exchanger according to an embodiment of the invention.
Figure 2:
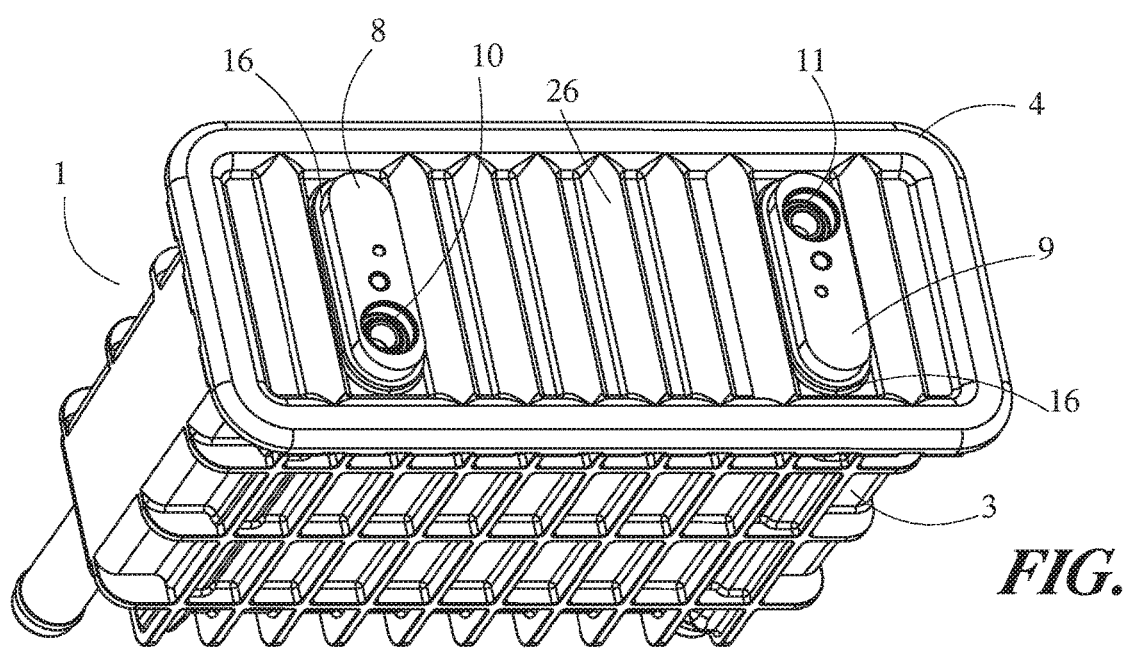
FIG. 2 is another perspective view of the liquid to refrigerant heat exchanger of FIG. 1.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A liquid to refrigerant heat exchanger 1 that is particularly well-suited to the use of a high-pressure refrigerant is depicted in FIGS. 1-5. Such a heat exchanger can find particular utility in, for example, automotive applications requiring a supply of chilled liquid coolant. Such applications can be particularly useful in electric vehicles, wherein the flow of chilled coolant is used to remove heat from batteries and/or power electronics that are used to provide propulsion to the vehicle. In other applications, such a liquid to refrigerant heat exchanger 1 can be used to provide chilled coolant for other purposes, such as passenger cooling. In still other applications the liquid to refrigerant heat exchanger 1 can be used to reject heat from the refrigerant to a flow of cooling liquid, such as in a heat pump application.

As depicted in the accompanying figures, the liquid to refrigerant heat exchanger 1 includes a plastic housing 3 that is sealingly joined to a metal closure plate 4. The metal closure plate 4 is preferably part of a brazed assembly 2, depicted in FIG. 3. The plastic housing 3 and the metal closure plate 4 together cooperate to define a coolant volume 20 within the liquid to refrigerant heat exchanger 1.

As best seen in FIG. 1, the plastic housing 3 includes a coolant inlet port 21 arranged at one end of the plastic housing 3 and a coolant outlet port 22 arranged at an opposite end of the plastic housing 3. This arrangement allows a flow of coolant 40 to enter into the liquid to refrigerant heat exchanger 1 at the first end through the port 21, to travel through the liquid to refrigerant heat exchanger 1 by traversing the coolant volume 20, thereby exchanging heat with a flow of refrigerant also passing through the liquid to refrigerant heat exchanger 1, and to subsequently be removed from the liquid to refrigerant heat exchanger 1 through the outlet port 22 as either a chilled or heated floor of coolant. In some other embodiments, the coolant inlet port 21 and the coolant outlet port 22 may alternatively be arranged at the same end of the plastic housing 3.

In some especially preferable embodiments, the plastic housing 3 is an injection-molded component. Such a construction allows for the coolant ports 21, 22 to be integrally formed in the plastic housing 3, thereby minimizing the number of discrete parts required. Additional features such as, for example, stiffening ribs and a gasket well, can also be readily included in the plastic housing 3 with such a construction.

The closure plate 4 can be produced as a stamped plate out of, for example, aluminum sheet material. Various features can be provided within the closure plate 4, such as an upturned peripheral flange 17 (as seen in FIG. 3) to be used as a crimp joint for the securing of the plastic housing 3. The closure plate 4 can also be provided with beads 26 formed into the plate to provide structural stiffening of the closure plate 4, as well as to locate and reinforce the gasket well of the plastic housing 3.

The brazed assembly 2 containing the closure plate 4 is depicted in FIG. 3, and is preferably an assembly of aluminum components that are joined together to form a monolithic construction in a single brazing operation. In the exemplary embodiment of FIG. 3, the brazed assembly 2 also includes a pair of cylindrical pipes 5 and 6 that function as manifolds for the refrigerant flow. In the exemplary embodiment, the cylindrical pipe 5 is an inlet manifold for a flow of refrigerant, while the cylindrical pipe 6 is an outlet manifold for the flow of refrigerant. The inlet manifold 5 and the outlet manifold 6 are hydraulically connected by multiple formed tubes 7 that function as refrigerant conduits to convey the refrigerant through the coolant volume 20 from the inlet manifold 5 to the outlet manifold 6.

The refrigerant conduits 7 are preferably flat aluminum tubes having one or more flow channels (not shown) extending therethrough. In particularly preferable embodiments, the refrigerant conduits 7 are aluminum micro-extrusions having a series of parallel-arranged flow channels. Such a construction is known to be particularly well-suited for use with high-pressure refrigerants, as it allows for increased pressure resistance through the use of small hydraulic diameters coupled with relatively thick walls to serve as pressure boundaries.

Figure 5:
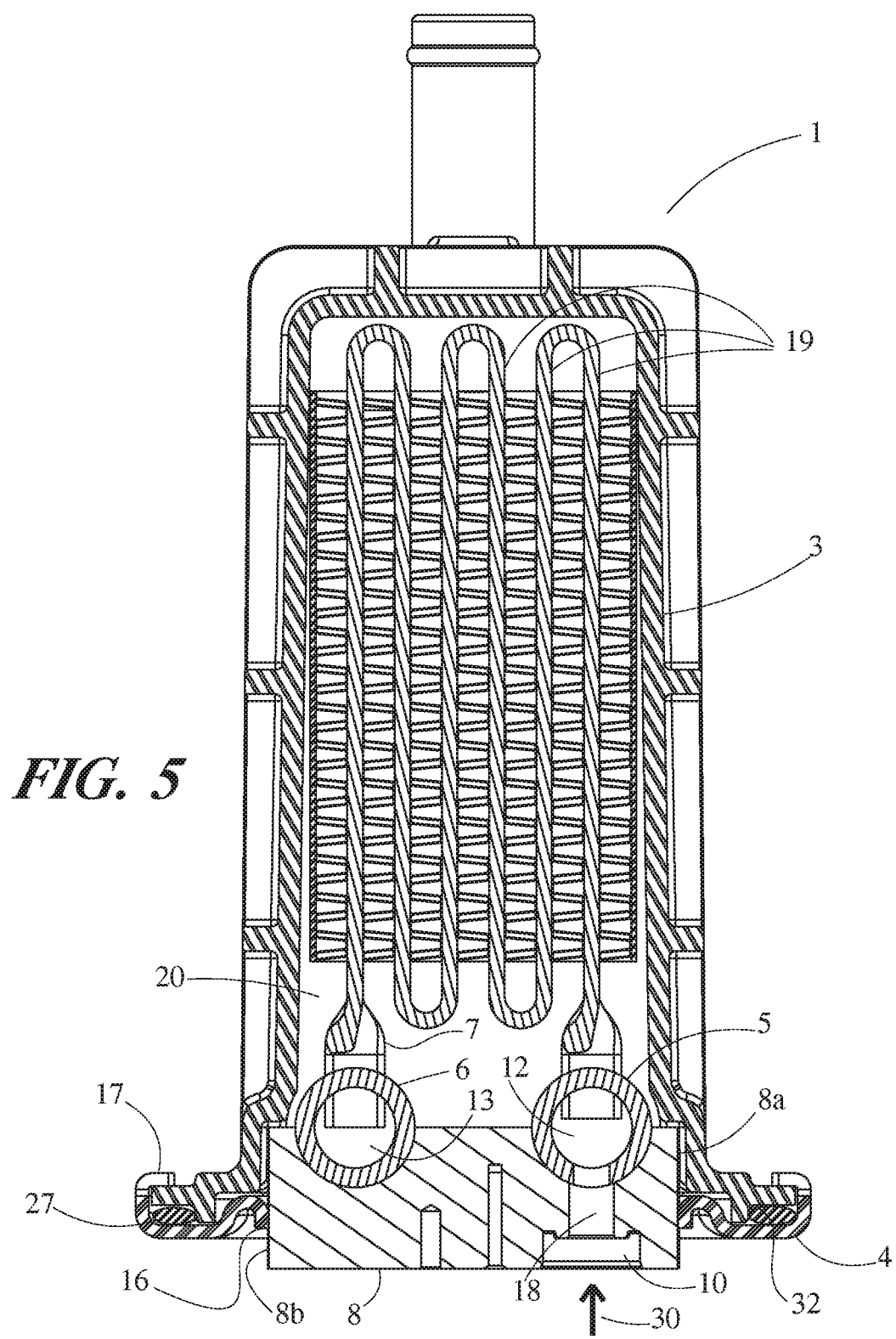
FIG. 5 is a side section view of the liquid to refrigerant heat exchanger of FIG. 1.

As best seen in the cross-sectional view of FIG. 5, each refrigerant conduit 7 has a series of U-bends formed to create multiple sequentially arranged passes 19 for the flow of refrigerant through the heat exchanger 1. The ends of each refrigerant conduit 7 are twisted by 90° about the tube-axial direction and are inserted into corresponding slots in the manifolds 5, 6. This allows for a close spacing of the refrigerant conduits 7 along the lengths of the manifolds, thereby maximizing the available outer surface are of the conduits 7 for purposes of heat transfer with the coolant.

Coolant fins 24 are arranged between the successive passes 19 of the conduits 7, and are brazed to the flat outer surfaces of the conduits 7 in order to provide both structural rigidity and surface area enhancement for the efficient transfer of heat to or from the coolant. The coolant fins 24 as depicted are of the lanced and offset type, although other types of fin surfaces can be contemplated. Aluminum side sheets 31 are optionally provided on either end of the stack of conduits 7 and fins 24 in order to both bound the coolant flow and to assist in securing the components prior to and during the brazing process.

The refrigerant inlet manifold 5 and the refrigerant outlet manifold 6 are joined to and supported by a pair of fitting blocks 8, 9. The fitting blocks 8, 9 are spaced apart from one another along the axial lengths of the manifolds 5, 6, and are provided with arcuate recesses to receive the manifolds 5, 6. Each of the fitting blocks extends partially through a flanged aperture 16 in the metal closure plate 4, so that a first portion (e.g. the portion 8a identified in FIG. 5 for the fitting block 8) of the fitting block is located within the coolant volume 20, and a second portion (e.g. the portion 8a identified in FIG. 5 for the fitting block 8) of the fitting block is located outside of the coolant volume 20.

The fitting block 8 is provided with a refrigerant inlet port 10 on the aforementioned second portion 8a, and is therefore referred to as an inlet fitting block. Refrigerant linework from the refrigerant system can be connected to the inlet fitting block 8 in order to deliver a flow of refrigerant 30 from the refrigerant system into the liquid to refrigerant heat exchanger 1 by way of the refrigerant inlet port 10. A refrigerant flow path 18 extends through the inlet fitting block 8 and provides fluid communication between the refrigerant inlet port 10 and an internal volume 12 of the refrigerant inlet manifold 5. The flow of refrigerant 30 can thereby be delivered to the refrigerant inlet manifold 5 and can be subsequently distributed to the flow channels within the refrigerant conduits 7.

In a similar manner, the fitting block 9 is provided with a refrigerant outlet port 11, and is therefore referred to as an outlet fitting block. The refrigerant outlet port 11 is in fluid communication with an internal volume 13 of the outlet manifold 6 in a similar manner to that described for the refrigerant inlet port 10, i.e. by way of a flow channel (not shown) extending through the outlet fitting block 9. After flowing through the refrigerant conduits 7, the refrigerant flow 30 is received into the internal volume 13 and is delivered to the refrigerant outlet port 11. Refrigerant linework from the refrigerant system can also be connected to the outlet fitting block 9 in order to return the flow of refrigerant from the liquid to refrigerant heat exchanger 1 back to the refrigerant system by way of the refrigerant outlet port 11.

The brazed assembly 2 of FIG. 3 can be created by assembling the various components (e.g. the manifolds 5 and 6, the conduits 7, the coolant fins 24, the optional side plates 31, the fitting blocks 5 and 6, and the closure plate 4) together with braze alloy appropriately placed on surfaces of the components that are to be joined. The braze alloy can be provided as a clad layer on one or more the components, or can be applied as a foil or a paste, or some combination of these. End caps 29 can additionally be inserted into the open ends of the manifolds 5 and 6 prior to brazing in order to seal off the manifolds. Once assembled, the assembly 2 can be fixtured and heated in a brazing oven in order to reflow the braze alloy and create the braze joints between the components.

In some especially preferable embodiments, the components that define the brazed assembly 2 are all constructed of a brazeable aluminum alloys. Such a construction advantageously provides a compact and low-weight design. However, in other embodiments the brazed assembly 2 can be constructed of other metals such as titanium, steel, copper, and the like.

Prior to assembly of the brazed assembly 2 and the plastic housing 3, coolant baffles 14 and/or 15 can be assembled to the brazed assembly 2 or to the plastic housing 3. The baffles 14, 15 can be constructed of a variety of materials, including plastic, elastomers, rigid foams, metal, etc. The plastic housing 3 is provided with recessed grooves 25 to receive the baffles and to retain their position once the liquid to refrigerant heat exchanger 1 is fully assembled. In some embodiments, the coolant baffles 14, 15 are provided with circular holes 28 that correspond to the ends of the manifolds 5, 6. The coolant baffles 14, 15 can be assembled to the brazed assembly 2 by insertion of the ends of the manifolds into the holes 28, thereby placing the coolant baffles 14, 15 in the appropriate position prior to the assembly of the plastic housing 3. In other embodiments, the coolant baffles 14, 15 can be inserted into the grooves 25 of the plastic housing 3 prior to the insertion of the brazed assembly 2.

The coolant baffles 14, 15 divide the coolant volume 20 into three portions. A heat exchange portion 20a of the coolant volume 20 is located between the first coolant baffle 14 and the second coolant baffle 15. The refrigerant conduits 7 and the coolant fins 24 are preferable located completely within the heat exchange portion 20a. The coolant baffle 14 separates the heat exchange portion 20a from a coolant inlet portion 20b arranged at the end of the heat exchanger 1 where the coolant inlet port 21 is located, so that the flow of coolant 40 received into the liquid to refrigerant heat exchanger 1 through the coolant inlet port 21 is discharged into the coolant inlet portion 20b. The coolant baffle 15 separates the heat exchange portion 20a from a coolant outlet portion 20c arranged at the end of the heat exchanger 1 where the coolant outlet port 22 is located, so that the flow of coolant 40 removed from the liquid to refrigerant heat exchanger 1 through the coolant outlet port 21 is received from the coolant outlet portion 20c.

The coolant baffles 14, 15 are each provided with an aperture 23 that corresponds to the outer periphery of the assembled coolant fins 24. The flow of coolant is directed and channeled into the coolant fins 24 from the inlet portion 20b of the coolant volume 20 through the aperture 23 of the coolant baffle 14. Similarly, the flow of coolant is discharged into the outlet portion 20c of the coolant volume 20 through the aperture 23 of the coolant baffle 15.

The liquid to refrigerant heat exchanger 1 is assembled by inserting the refrigerant conduits 7, coolant fins 24, and manifolds 5 and 6 of the brazed assembly 2 into the plastic housing 3. An elastomeric seal 27 is arranged within a gasket well 32 that extends along the periphery of the opening of the plastic housing 3 prior to the insertion of the brazed assembly 2. After the brazed assembly 2 is fully inserted, the peripheral flange 17 is crimped over onto the peripheral edge of the plastic housing 3 in order to compress the seal 27 so that leakage of coolant is prevented. Beads 26 can be formed into the closure plate 4 in order to back-stop the gasket well and prevent deformation of the plastic housing 3 during the crimping process.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A liquid to refrigerant heat exchanger comprising:
   a coolant volume defined at least partially by a plastic housing and a metal closure plate, the plastic housing being sealingly joined to the closure plate along an outer periphery of the closure plate;
   a cylindrically shaped inlet manifold for a refrigerant flow arranged within the coolant volume;
   a cylindrically shaped outlet manifold for the refrigerant flow arranged within the coolant volume;
   a plurality of refrigerant conduits arranged within the coolant volume and extending between the inlet manifold and the outlet manifold to convey the refrigerant flow from the inlet manifold to the outlet manifold;
   an inlet fitting block joined to and extending through the closure plate, the inlet fitting block having a first portion arranged within the coolant volume and a second portion arranged outside of the coolant volume, the inlet manifold being joined to the first portion of the inlet fitting block;
   an outlet fitting block joined to and extending through the closure plate, the outlet fitting block having a first portion arranged within the coolant volume and a second portion arranged outside of the coolant volume, the outlet manifold being joined to the first portion of the outlet fitting block;
   a refrigerant inlet port arranged on the second portion of the inlet fitting block, the refrigerant inlet port being in fluid communication with an internal volume of the inlet manifold by way of a refrigerant flow path extending through the inlet fitting block; and
   a refrigerant outlet port arranged on the second portion of the outlet fitting block, the refrigerant outlet port being in fluid communication with an internal volume of the outlet manifold by way of a refrigerant flow path extending through the outlet fitting block.

2. The liquid to refrigerant heat exchanger of claim 1, wherein the closure plate, the inlet manifold, the outlet manifold, the plurality of refrigerant conduits, the inlet fitting block, and the outlet fitting block are joined together by braze joints to define a leak-free refrigerant flow path between the refrigerant inlet port and the refrigerant outlet port.

3. The liquid to refrigerant heat exchanger of claim 1, wherein at least one of the inlet fitting block and the outlet fitting block is joined to both the inlet manifold and the outlet manifold.

4. The liquid to refrigerant heat exchanger of claim 3, wherein the inlet manifold and the outlet manifold are each joined to both the inlet fitting block and the outlet fitting block.

5. The liquid to refrigerant heat exchanger of claim 1, wherein the inlet fitting block and the outlet fitting block each extend through flanged apertures in the closure plate.

6. The liquid to refrigerant heat exchanger of claim 1, wherein the plastic housing is sealingly joined to the closure plate by a peripheral crimp joint.

7. The liquid to refrigerant heat exchanger of claim 1 wherein each of the plurality of refrigerant conduits includes a plurality of sequentially arranged passes through the coolant volume, further comprising a plurality of coolant fins arranged between and joined to adjacent ones of the plurality of sequentially arranged passes.

8. The liquid to refrigerant heat exchanger of claim 1, wherein the coolant volume includes a coolant inlet portion arranged at a first end of the heat exchanger, a coolant outlet portion arranged at a second end of the heat exchanger opposite the first end, and a heat exchange portion arranged between the coolant inlet portion and the coolant outlet portion, the plurality of refrigerant conduits being arranged within the heat exchange portion of the coolant volume.

9. The liquid to refrigerant heat exchanger of claim 8, wherein each of the plurality of refrigerant conduits includes a plurality of sequentially arranged passes through the coolant volume, further comprising a plurality of coolant fins arranged between and joined to adjacent ones of the plurality of sequentially arranged passes.

10. The liquid to refrigerant heat exchanger of claim 9, further comprising a first coolant baffle arranged between the coolant inlet portion and the heat exchange portion of the coolant volume and a second coolant baffle arranged between the coolant outlet portion and the heat exchange portion of the coolant volume, the first and the second coolant baffles each having an aperture that corresponds to an outer periphery of the plurality of coolant fins.

11. The liquid to refrigerant heat exchanger of claim 10, wherein the closure plate, the inlet manifold, the outlet manifold, the plurality of refrigerant conduits, the inlet fitting block, the outlet fitting block, and the plurality of coolant fins are all joined together in a single brazing operation to define a brazed assembly, and wherein the first coolant baffle and the second coolant baffle are assembled to the brazed assembly prior to inserting the brazed assembly into the plastic housing.

12. The liquid to refrigerant heat exchanger of claim 10, wherein the first and the second coolant baffles are each partially received within recessed grooves provided in the plastic housing.

13. The liquid to refrigerant heat exchanger of claim 8, further comprising a coolant inlet port and a coolant outlet port, each formed as an integral part of the plastic housing, the coolant inlet port being configured to direct a flow of coolant into the coolant inlet portion of the coolant volume and the coolant outlet port being configured to receive a flow of coolant from the coolant outlet portion of the coolant volume.

14. The liquid to refrigerant heat exchanger of claim 1, wherein the plastic housing is sealingly joined to the metal closure plate by way of an elastomeric seal and a crimp joint extending along the outer periphery of the metal closure plate.

15. The liquid to refrigerant heat exchanger of claim 14, wherein the elastomeric seal is arranged within a gasket well provided by the plastic housing.

* * * * *